US008627047B2

(12) United States Patent
Tsai et al.

(10) Patent No.: US 8,627,047 B2
(45) Date of Patent: Jan. 7, 2014

(54) STORE DATA FORWARDING WITH NO MEMORY MODEL RESTRICTIONS

(75) Inventors: Aaron Tsai, Poughkeepsie, NY (US); Barry W. Krumm, Poughkeepsie, NY (US); James R. Mitchell, Poughkeepsie, NY (US); Bradley Nelson, Austin, TX (US); Brian D. Barrick, Pflugerville, TX (US); Chung-Lung Kevin Shum, Wappingers Falls, NY (US); Michael H. Wood, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 12/031,898

(22) Filed: Feb. 15, 2008

(65) Prior Publication Data
US 2009/0210679 A1   Aug. 20, 2009

(51) Int. Cl.
G06F 7/38       (2006.01)
G06F 9/00       (2006.01)
G06F 9/44       (2006.01)
G06F 13/00      (2006.01)
G06F 13/28      (2006.01)

(52) U.S. Cl.
USPC ............................ 712/225; 711/150; 711/154

(58) Field of Classification Search
USPC ......................................................... 712/225
See application file for complete search history.

(56) References Cited

U.S. PATENT DOCUMENTS

| | | | | |
|---|---|---|---|---|
| 6,021,485 A | * | 2/2000 | Feiste et al. | 712/216 |
| 6,134,646 A | * | 10/2000 | Feiste et al. | 712/23 |
| 6,141,747 A | * | 10/2000 | Witt | 712/225 |
| 6,338,128 B1 | * | 1/2002 | Chang et al. | 711/203 |
| 6,393,536 B1 | * | 5/2002 | Hughes et al. | 711/159 |
| 6,581,151 B2 | * | 6/2003 | Henry et al. | 711/203 |
| 6,678,807 B2 | * | 1/2004 | Boatright et al. | 711/154 |
| 6,901,540 B1 | * | 5/2005 | Griffith et al. | 714/48 |

OTHER PUBLICATIONS z/Architecture. "Principles of Operation". Sixth Edition (Apr. 2007). IBM. 1218 pages.

* cited by examiner

*Primary Examiner* — Andrew Caldwell
*Assistant Examiner* — William B Partridge
(74) *Attorney, Agent, or Firm* — Cantor Colburn LLP; John Campbell

(57) ABSTRACT

A pipelined microprocessor includes circuitry for store forwarding by performing: for each store request, and while a write to one of a cache and a memory is pending; obtaining the most recent value for at least one complete block of data; merging store data from the store request with the complete block of data thus updating the block of data and forming a new most recent value and an updated complete block of data; and buffering the updated complete block of data into a store data queue; for each load request, where the load request may require at least one updated completed block of data: determining if store forwarding is appropriate for the load request on a block-by-block basis; if store forwarding is appropriate, selecting an appropriate block of data from the store data queue on a block-by-block basis; and forwarding the selected block of data to the load request.

10 Claims, 4 Drawing Sheets

Fig. 1

-- PRIOR ART --

STORE DATA FORWARDING WITH NO MEMORY MODEL RESTRICTIONS

BACKGROUND OF THE INVENTION

The invention herein is related to design of microprocessors, and in particular, to techniques for addressing cache loads waiting prior to cache write backs.

Figure 1:
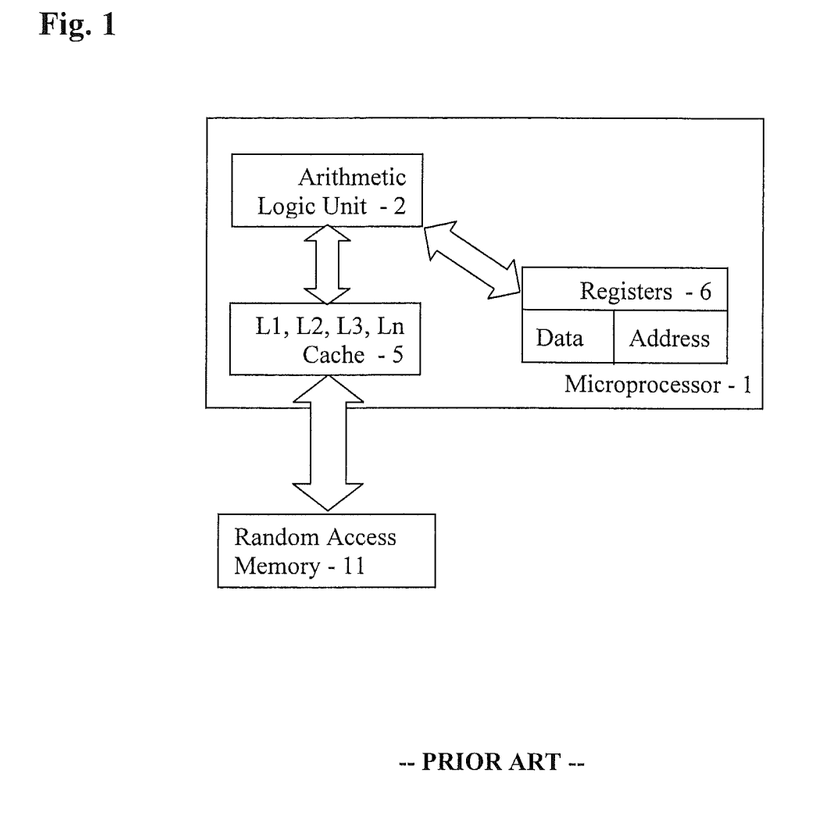
FIG. 1 is a block diagram presenting aspects of a typical microarchitecture.

As microprocessor design continues to advance, new problems arise. Consider, for example, an existing (prior art) architecture, aspects of which are depicted in FIG. 1. First, note that FIG. 1 is a simplified depiction for purposes of discussion and does not take into account that each microprocessor 1 may include pluralities of various components.

The microprocessor 1 typically includes components such as one or more arithmetic logic units 2, one or more caches 5, and a plurality of registers 6. Typically, the cache 5 provides an interface with random access memory 11. Of course, different configurations of other components are typically included in the microarchitecture, but are not shown here for simplicity.

Most processors run programs by loading an instruction from memory 11 and decoding the instruction; loading associated data from registers or memory 11 that is needed to process the instruction; processing the instruction; and storing any associated results in registers or memory 11. Complicating this series of steps is the fact that access to the memory 11, which includes the cache 5, main memory (i.e., random access memory 11) and other memory such as non-volatile storage like hard disks, (not shown) involves a lengthy delay (in terms of processing time).

One technique to improve performance is the use of "pipelining." Pipelines improve performance by allowing a number of instructions to work their way through the microprocessor at the same time. For example, if each of the previously mentioned 4 steps of running programs is implemented as a pipeline cycle, then microprocessor 1 would start to decode (step 1) a new instruction while the last instruction waits for results to continue. This would allow up to four instructions to be "in flight" at one time, making the microprocessor 1 appear to be up to four times as fast. Although any one instruction takes just as long to complete (there are still four steps) the microprocessor 1 as a whole "retires" instructions much faster and can be run at a much higher clock speed than in prior designs.

Unfortunately, in a pipelined microprocessor 1, a special condition exists. This condition is commonly referred to as "load-hit-store" (and also known as "operand store compare"). In load-hit-store, a load (also referred to herein as a "fetch" or as a "read") from memory 11 (step 2 above) designates an address in memory that is the same as an address designated by a store (also referred to herein as an "update" or a "write") to memory 11.

In load-hit-store, the most recent value intended for storing in an address location is not available for use in the load. That is, the data required for the load may not yet be stored in the address of the memory 11 or in the cache 5 and may be in progress, elsewhere in the microprocessor 1.

Previous designs have attempted to minimize delays due to load-hit-store conflicts by using store forwarding mechanisms to allow loads to reference store data result values before they are written into the cache 5. Thus, such designs attempt to solve this problem without requiring loads to wait for either the cache 5 or memory 11 to be written before they execute. Consider three examples provided below that relate to store forwarding or load-hit-store handling.

A first example is provided in U.S. Pat. No. 6,678,807, entitled "System and method for multiple store buffer forwarding in a system with a restrictive memory model" and issued on Jan. 13, 2004. This patent discloses use of multiple buffers for store forwarding in a microprocessor system with a restrictive memory model. In an embodiment, the system and method allow load operations that are completely covered by two or more store operations to receive data via store buffer forwarding in such a manner as to retain the side effects of the restrictive memory model thereby increasing microprocessor performance without violating the restrictive memory model.

A further example is that of U.S. Pat. No. 6,393,536, entitled "Load/store unit employing last-in-buffer indication for rapid load-hit-store," and issued on May 21, 2002. This patent discloses a load/store unit that includes a buffer configured to retain store memory operations which have probed the data cache. Each entry in the buffer includes a last-in-buffer (LIB) indication which identifies whether or not the store in that entry is the youngest store in the buffer to update the memory locations specified by the corresponding store address. Load addresses are compared to the store addresses, and the comparison result is qualified with the corresponding LIB indication such that only the youngest store is identified as a hit. At most one load hit store is detected.

The third example is provided in U.S. Pat. No. 6,581,151, entitled "Apparatus and method for speculatively forwarding storehit data based on physical page index compare," and issued on Jun. 17, 2003. This patent describes a speculative store forwarding apparatus in a pipelined microprocessor that supports paged virtual memory. The apparatus includes comparators that compare only the physical page index of load data with the physical page indexes of store data pending in store buffers to detect a potential store-hit. If the indexes match, forwarding logic speculatively forwards the newest store-hit data based on the index compare. The index compare is performed in parallel with a TLB lookup of the virtual page number of the load data, which produces a load physical page address. The load physical page address is compared with the store data physical page addresses to verify that the speculatively forwarded store-hit data is in the same page as the load data. If the physical page addresses mismatch, the apparatus stalls the pipeline in order to correct the erroneous speculative forward. The microprocessor stalls until the correct data is fetched.

Prior solutions to load-hit-store conflicts using store forwarding have had difficulties with certain types of overlap between the load memory areas and store memory areas. The exemplary patents above either describe restrictions on the memory area overlap between loads and stores for allowing store forwarding, do not mention these restrictions, or do not attempt to address solutions for avoiding these restrictions at all. The following example demonstrates a load-hit-store memory overlap condition that prior art store forwarding designs cannot or did not attempt to resolve with store forwarding.

Suppose there is a store A instruction that stores to 4 bytes in address locations 0, 1, 2, and 3. This store A instruction is followed closely by a load B instruction that loads 4 bytes from address locations 2, 3, 4, and 5. (Note that address location 5 is not to be confused with the reference numeral used to designate the cache 5). If the store A has not yet updated the cache 5 or memory 11 at the time that load B requires the data, then there is a load-hit-store condition. This particular load-hit-store condition only exists for address locations 2 and 3. Locations 0 and 1 stored to by store A are not needed by load B. Also, the 2 bytes loaded by load B in address locations 4 and 5 are not stored to by store A. Not only does store A not store to addresses 4 and 5, in previous designs the structures holding the data for store A would have no record of the values of locations 4 and 5. So, for load B to get all of the bytes it needs, it must get locations 2 and 3 from store A using store forwarding, and locations 4 and 5 from somewhere else (usually this would be the cache 5). In prior art, this type of "partial overlap" between store A and load B is a violation of the restrictive memory model used and store forwarding is not allowed because there is no mechanism to determine which pieces of data should be forwarded from the store and which pieces of data need to be forwarded from the cache 5. A mechanism to effectively forward parts of load data from different sources does not currently exist. The existing or prior art restrictive memory model assumes that either all data is forwarded from a single store structure or no data is forwarded and all data is accessed normally from the cache. Any case of store and load overlap that cannot be resolved by either of these two methods will result in a load-hit-store penalty (load must wait for the previous stores, that the load depends upon, to write the data into the cache).

An additional example of a violation of prior art restrictive memory models would be store A to locations 0, 1, 2, and 3 followed by a store B to locations 2 and 3, followed by a load C to locations 0, 1, 2, and 3. If stores A and B have not yet updated the cache 5 at the time load C needs to load its data from the cache, there is a load-hit-store condition. Though store A does cover the exact same locations as load C it would be incorrect to forward all the bytes from store A since store B is more recent than store A, so locations 2 and 3 should be forwarded from store B while locations 0 and 1 are forwarded from store A. Prior art solutions would be able to handle the condition where there is a store A and load C without store B, but having store B in the middle violates the standard restrictive memory model used for store forwarding. As a result, the load must take a load-hit-store penalty. In order to avoid strict memory area overlap based restrictions on store forwarding, a new solution is required.

What are needed are solutions to overcome situations where the most recently updated value for an address location from a respective store is not available for the load to use including cases where store data only partially overlaps with load data and cases where multiple stores may partially overlap with the load data and partially overlap with each other.

BRIEF SUMMARY OF THE INVENTION

The shortcomings of the prior art are overcome and additional advantages are provided through the provision of, in one embodiment, a pipelined microprocessor including circuitry adapted for store forwarding, the microprocessor including circuits for performing: for each store request, and while a write to one of a cache and a memory is pending; obtaining the most recent value for at least one complete block of data; merging store data from the store request with the complete block of data thus updating the block of data and forming a new most recent value and an updated complete block of data; and buffering the updated complete block of data into a store data queue; for each load or store request, where the load request may require at least one updated completed block of data and the store request may require the most recent value for at least one complete block of data for merging with store data and forming a new most recent value and an updated complete block of data: determining if store forwarding is appropriate for the load or store request on a block-by-block basis; if store forwarding is appropriate, selecting an appropriate block of data from the store data queue on a block-by-block basis; and forwarding the selected block of data to the load or store request.

An embodiment of a method for loading data in a pipelined microprocessor includes: issuing a load request that includes a load address requiring at least one block of data; determining if the at least one load block address matches any block addresses in a store address queue; if there is a match, then for the most recent entry in the queue that matched the corresponding block address, reading a data block from a buffer register designated by the store address queue and sending the data block to satisfy the load request; and if there is no match, then reading data block from a cache based on the address and sending the data block to satisfy the load request.

Another embodiment of a method for storing data in a pipelined microprocessor includes: issuing a store request that includes a store address; determining if the store address matches an address in a store address queue; if there is a match, then for the most recent entry in the store address queue that matched, reading data from a register designated by the store address queue and sending the data as at least one block of data for merging with data from the store request; if there is no match, then reading data from a cache based on the store address and sending the at least one block of data for merging with the data from the store request; and setting at least one state bit for the store address and writing the store address queue with the store address.

BRIEF DESCRIPTION OF THE DRAWINGS

Referring now to the drawings wherein like elements are numbered alike in the several figures, wherein.

The detailed description explains the preferred embodiments of the invention, together with advantages and features, by way of example with reference to the drawings.

DETAILED DESCRIPTION OF EXEMPLARY EMBODIMENTS

Disclosed herein are aspects of microarchitecture for a microprocessor 1. In particular, the microarchitecture provides advanced implementation of memory accessing including loading and storing to memory. The advanced implementation is referenced as an "enhanced microarchitecture 100" shown in FIG. 2 and as otherwise discussed herein.

Generally presented herein are certain aspects of the invention, though the present invention may be applied in other embodiments not described herein. For example, other embodiments may be realized by changing the implementation to match the requirements of the architecture or microarchitecture of a microprocessor 1. Accordingly, it is considered such other embodiments known now or later devised are contemplated by and a part of this invention.

Two architectural or microarchitectural requirements or variables that may affect embodiments of this invention are the smallest granularity of data that can be addressed and loaded from memory and the largest granularity of data that can be addressed and loaded from memory. It is assumed that these two variables are not necessarily the same. How these (and other) requirements and variables may affect embodiments of the invention as described below.

For convenience, some additional definitions are provided. First, as used herein, the term "load" is used generally and makes reference to an instruction for loading data from memory 11 into a register 6 (also a "load request"), as well as the process of loading from memory 11. In some instances, the term "load" makes reference to data recently retrieved from memory 11. Similarly, the term "store" is used generally and makes reference to an instruction for storing data from a register 6 into memory 11 (also, a "store request"). In some instances, the term "store" makes reference to data recently written to memory 11. The store may relate to certain targets, such as a store data queue. The term "granularity" generally refers to a size of data in relation to computation or access to computing resources.

Further, it should be recognized that the teachings herein may include other circuitry and components as necessary for providing the functions and features described herein. As an example, a component such as a "load/store unit" may be used for implementation, at least in part. Aspects may include embodiments of machine executable instructions stored on machine readable media for executing various tasks (i.e., software). Various combinations of hardware, firmware and software may be used for implementing the features and functions described herein. Accordingly, while the description provided herein is generally in reference to enhanced microarchitecture, the exemplary embodiments provided herein are not limiting of the invention and are merely illustrative.

Further, the discussion of loads and store to a typical microprocessor implementation where these memory accesses are going through the local cache (L1), or simply refer to as cache, which is usually managed by a "load/store unit". Operations about multi-level cache and memory relations are not necessarily described herein.

The enhanced microarchitecture 100 as described herein minimizes the penalty of having a load wait for completion of a cache update from all stores to the same address(es) ahead of the load in the pipeline. Each load only need to wait for all the store update values to be available in the microprocessor 1. In addition, there are no restrictions of either the load or stores in the pipeline for removing dependency on writing the cache 5, such as those restrictions that are based purely on the amount of overlapping memory locations.

That is, the enhanced microarchitecture 100 provides for forwarding of store data prior to the writing of cache 5 or memory 11 for the store. Accordingly, store forwarding minimizes the penalty of waiting for store writes to the cache 5 or memory 11 prior to a subsequent load.

As an overview, the enhanced microarchitecture 100 provides for saving off (buffering) snapshots of the most current values of memory 11 into a store data queue after each store. The most current values in the store data queue include both data that is updated by the store as well as data that is not updated (data not yet updated by the store is referred to herein as "background data"). Then, using control logic and the results of address compares, a determination is made as to whether store forwarding can be used to avoid the normal penalties of load-hit-store and which store data queue entry should be forwarded. The data forwarded from the store queue entry is used as a contiguous block of data that acts as a complete replacement for the data normally loaded from the cache 5. Note that the block size (which is the store data queue entry size) can be smaller than the normal cache return size and can replace only part of the overall cache return (with the rest of the return data still referencing the cache data). In this way, there is no need for subset or superset memory area overlap restrictions on either the load or the store(s), since each part of the load data can either reference the cache data or store forward data from any queue entry. Accordingly, different queue entries (meaning different stores) can independently be used to forward to the different parts of any given load.

Also for convenience, a discussion of aligned data, unaligned data and memory ranges is provided. In this regard, a "sub-block" describes the smallest granularity of memory 11 that can be addressed by a load or store, and all loads and stores access or update an integral number of sub-blocks. Then assume that an exemplary embodiment of enhanced microarchitecture 100 has a sub-block size of one (1) byte. The exemplary embodiment defines a word to be four (4) bytes and a double-word to be eight (8) bytes. By convention, an aligned range of data always begins at a memory address that is an integral multiple of its length. For example, an aligned double-word always starts on a byte address that is an integral multiple of eight (8) and includes all the bytes up until the next byte address that is a multiple of eight (8) (for a total length of eight (8) bytes). Assume the largest granularity of memory that is used for storage by a single instruction is eight (8) bytes (with a minimum length of one (1) byte and no restrictions on starting or ending address so the data can be unaligned). Then assume that each store pipe can perform one store instruction each cycle and that there are two store pipes that can independently send store data into a Load/Store Unit at the same time in the cycle. Also, assume that there are two (2) load pipes and each load pipe can access one (1) aligned even double-word and one (1) odd aligned double-word of data and the even and odd double-word of data do not necessarily belong to the same aligned quad-word of memory but are contiguous (an even double-word is a double-word that begins at an even integral byte address of 8, and an odd double-word begins at an odd integral byte address of eight (8)). Note that depending on the embodiment, there typically may be other restrictions for returning both even and odd DWs on a given pipe. For example, it may be required that both even and odd DWs belong to the same cache line entry for both to return the correct data from the cache. The structure of the cache 5 would be built to support these load return requirements. For example, if the address width is 64 bits with bit 0 as the most significant address bit and bit 63 as the least significant bit, then bit 63='0' would describe all the even bytes and bit 63='1' would describe all the odd bytes. Then this would mean that any access to bytes with address bit 60='0' would be to an even double-word and any access to bytes with address bit 60='1' would be to an odd double-word. For the even and the odd double-word to be allowed to be different quad-words would mean that address bits 0:59 could be different. Then, a cache structure to support this load bandwidth requirement would have one half of the cache supporting requests to all bytes that have address bit 60='0' (even double-words) and one half of the cache supporting requests to bytes that have address bit 60='1' (odd double-words). Each cache half would need to be able to take requests to different address bits 0:59, and each cache half would then support up to two (2) independent requests at once since there are two (2) independent load pipes.

Given the base design descriptions, one embodiment includes a block size the same as the largest contiguous data return from the cache, which is one (1) double-word. In this implementation, the block size is used as the store data queue entry size. In this embodiment, the largest aligned contiguous data return from the cache determines the largest granular data size that is loaded from memory. Since the cache return from each cache half is one (1) double-word that is aligned to storage boundaries (eight (8) bytes starting with address bits 61:63='000'b and ending with address bits 61:63='111'b), an easy implementation for store forwarding makes the data in the queue entry storage aligned. If the store data queue entries are storage aligned, then the data queue entries are split into two (2) halves, one (1) for even double-words and one (1) for odd double-words, similar to the cache. This provides an easy correlation between queue entries and the cache for store forwarding, and also provides a way to handle store data that can be eight (8) bytes in size (which is not necessarily aligned to memory boundaries). Because the stores are contiguous and the maximum store size is eight (8) bytes, the design can only update bytes in up to two (2) different memory aligned double-words (in this embodiment), and in particular it can only update at most one (1) even double-word and one (1) odd double-word (though the even double-word may be updated first and then the odd double-word or vice-versa).

Note for this embodiment, there are advantages in dealing with block sizes that are based on the largest granularities of data manipulation and data transfer supported by the microprocessor (double-word) rather than with the smallest granularities of data manipulation required by the architecture (byte). When using a large block size matching the maximum data granularity (as detailed above), at most two (2) sets of independent compares and controls are needed to manipulate the two (2) blocks. If the smallest block size was used (byte), then there would need to be at least as many independent sets of compares and controls as the largest data size divided by the minimum block size which in this embodiment would be eight (8) sets of compares and controls (one (1) set for each byte in a double-word).

In this embodiment, the overall structure used to handle all stores and is referred to as a "store queue." A store queue includes of one or more entries, with each entry including a starting address register, an ending address register, a starting data register, an ending data register, and some control states (such as valid bits). The data registers hold memory aligned double-word blocks such that the starting data register would hold memory contents directly associated with the entry's starting address 0:60, and the ending data register would hold memory contents directly associated with the entry's ending address 0:60. The portion of the store queue all the address registers is referred to as the store address queue. The portion of the store queue including all the data registers is referred to as the store data queue.

Figure 2:
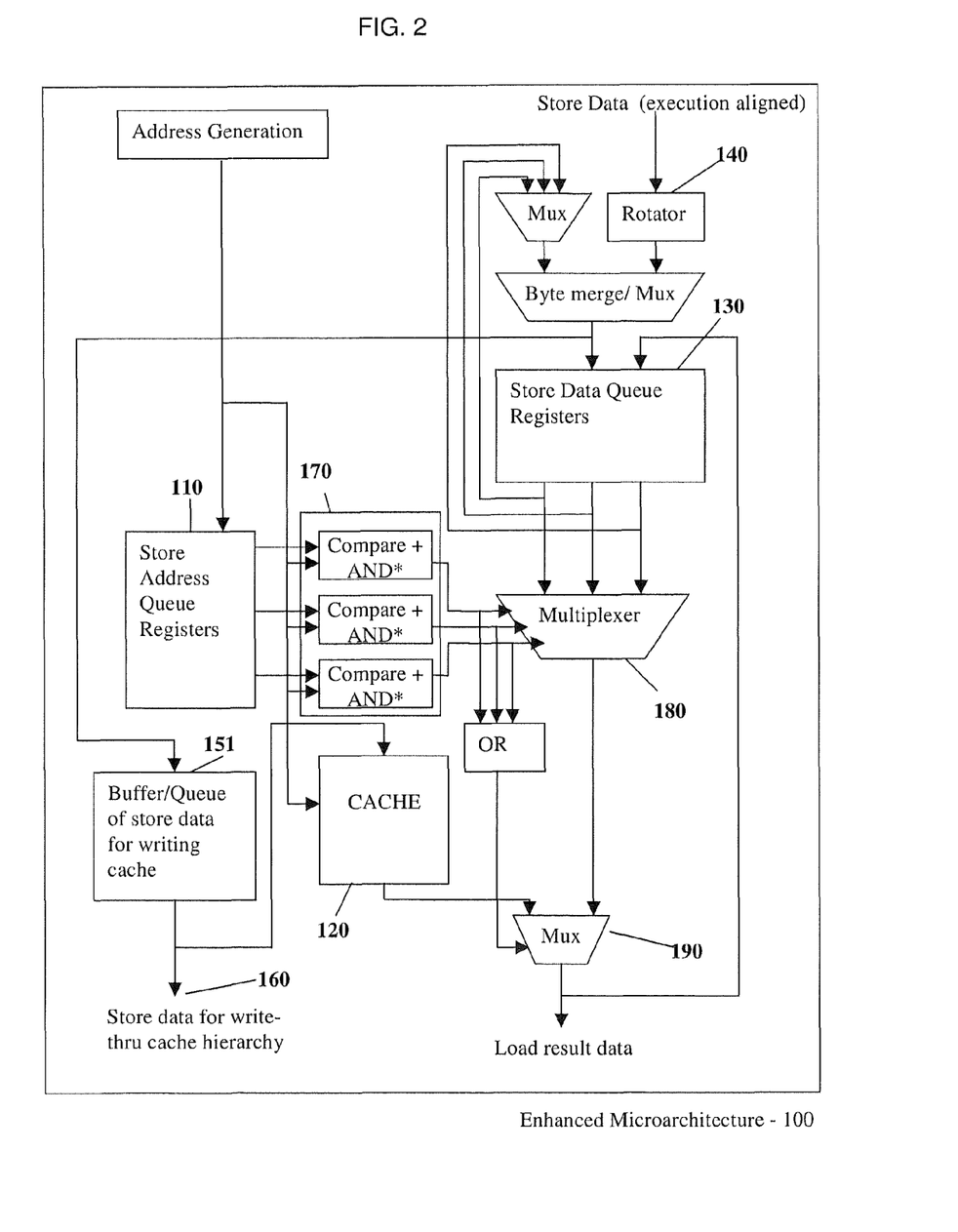
FIG. 2 is a block diagram illustrating aspects of an exemplary implementation the teachings herein.
Figure 3:
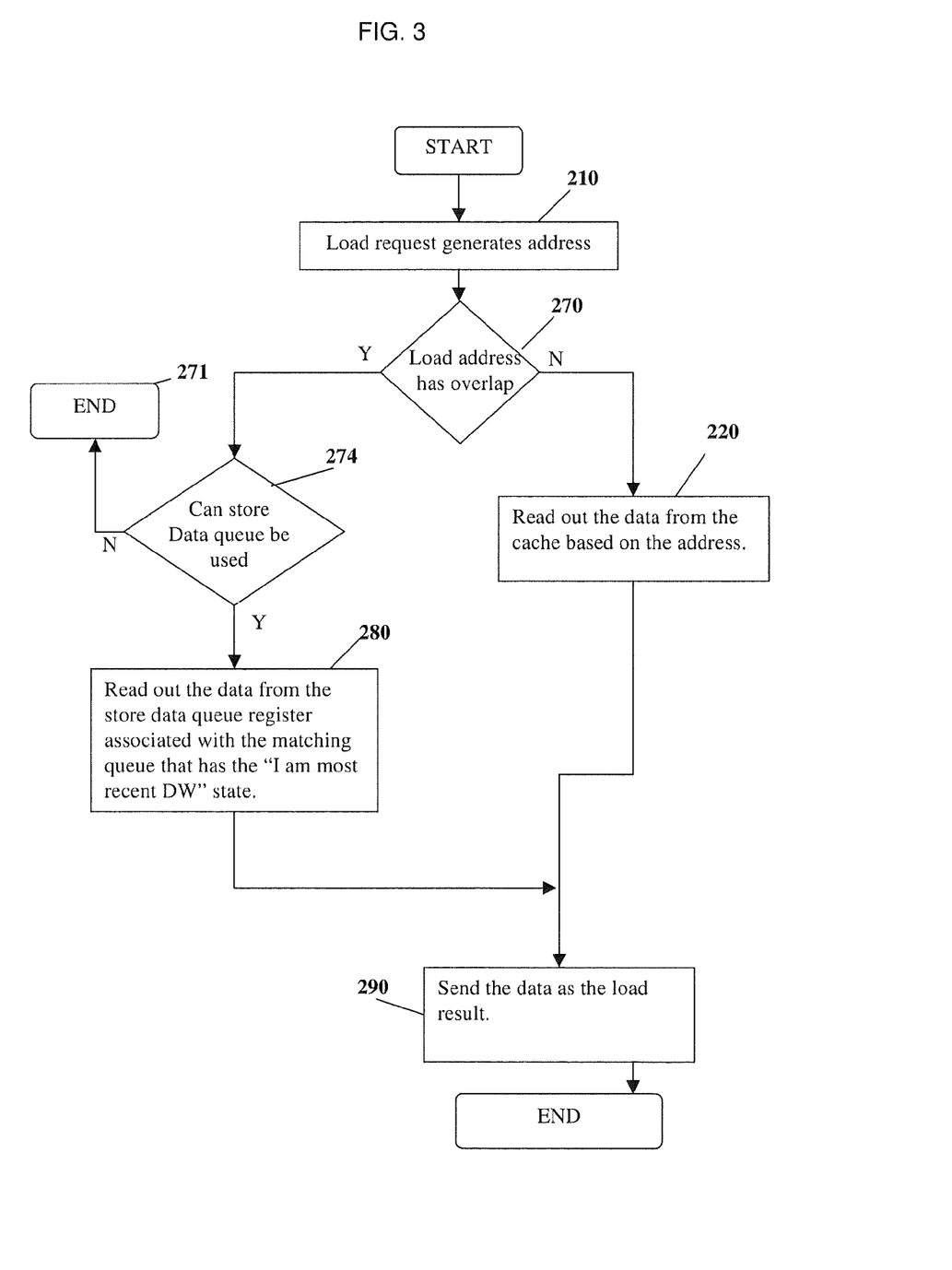
FIG. 3 is a flow chart depicting an exemplary process for a load request.
Figure 4A:
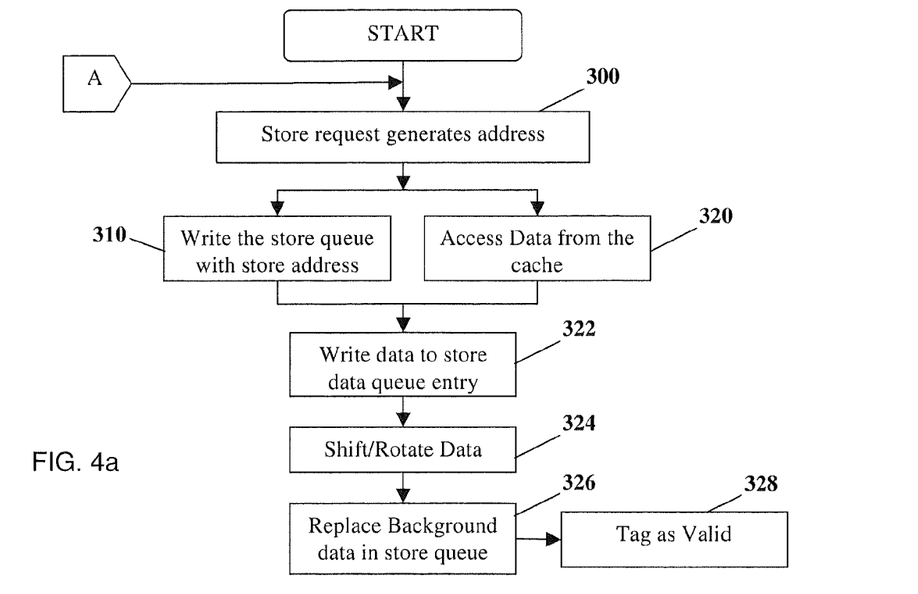
FIGS. 4a and 4b flowcharts depicting an exemplary process for fulfilling a store address request.
Figure 4B:
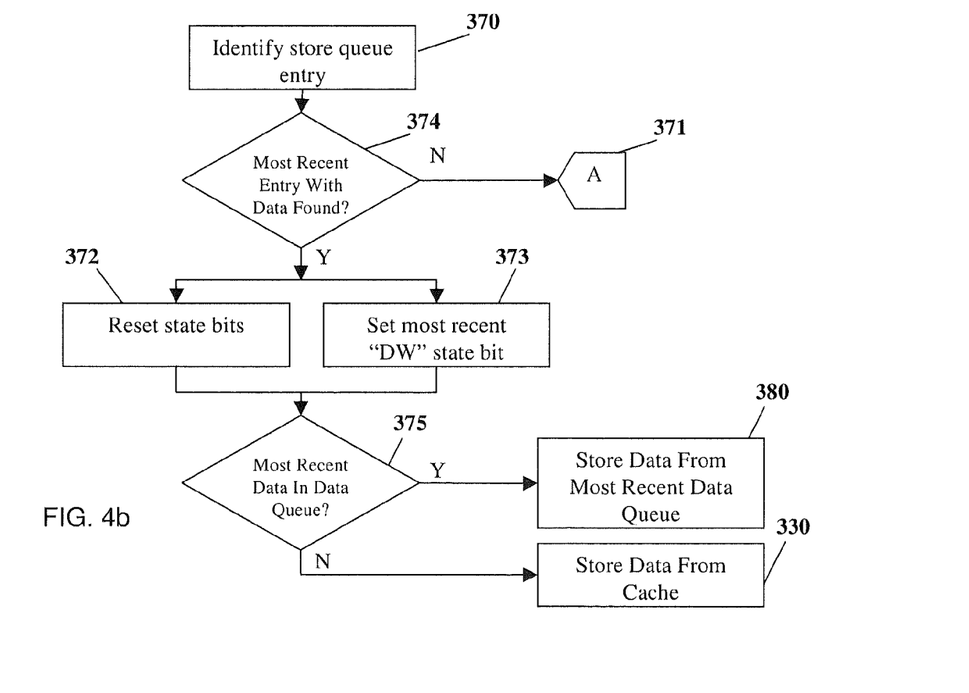

Refer now to FIG. 2, which presents a block diagram that shows aspects of implementation of the microarchitecture, and also to FIGS. 3 and 4. FIG. 2 depicts an embodiment showing three (3) store address queue and store data queue entries, while FIGS. 3 and 4 are exemplary flow charts that show general aspects of handling load and store address requests respectively by the enhanced microarchitecture 100.

Assume that the microprocessor 1 requests loads and stores with their addresses in program order, and that store data is always presented in order, and that the store address is always available before the store data is presented. The processing of a store would involve taking the address of the store request 300 and writing the address (and other request related information) into a store address queue 110/310. At the same time, the store would be treated as a load and the data from the cache for that address location would be accessed 120/320. This data is accessed from the cache in order to have all the bytes of the memory aligned double-word available that may not be updated for the store (the "background data"). The memory aligned double-word or two (2) double-words of background data for the store 130 are then written into the appropriate store data queue entry (or entries) reserved for the store at block 322. When the store result data is available, the store data is shifted or rotated as necessary to align the store bytes to memory boundaries by a rotator 140 at block 324. Then the store data is written into the associated store data queue entry, but only the appropriate bytes are updated such that the background data that is already saved off in the store data queue entry is replaced by the store data 326. This process is referred to as "byte merging" the store data onto the background data. The resulting even and/or odd double-words in the store data queue that are the result of byte merging are now the correct and most recent values of the double-word for the state of the microprocessor (and overall system) at the time of the completion of the store. The queue entry or entries can now be tagged as valid for store forwarding for any following instructions that need to access those double-words at block 328. The queue entry or entries are now also valid for writing the entire contents of the double-word into the cache hierarchy 160.

For a load, first the address of the load 210 is compared to all the stores that are ahead of it in the pipeline that have not yet written their stores into the cache 170/270. This embodiment assumes the microprocessor 1 is making load and store requests with addresses in program order, so all stores that are ahead of this load have known addresses that are written into the store address queue. For all cases where the addresses for the bytes of the load overlap with any addresses for the bytes that are being stored and have not yet written the cache, there are one of two results.

In a first result, there are one or more bytes of the load where the most recent store data has not yet been merged with double-word based background data and written into the store data queue (store forwarding valid bit is off). In this case, the load-hit-store condition is not resolved with store forwarding and the load request cannot be processed at this time 271.

As an alternative, all of the bytes of the load that overlap with store data correspond with most recent store data that have already been merged with background data such that the most recent value or values for the memory aligned double-word or double-words associated with those bytes are available in the store data queue (all required store forwarding valid bits are on) at block 274. In this case, the load-hit-store condition can be resolved by using the appropriate double-words of data from the store data queue corresponding to the most recent double-word for those double-words of the load that contain bytes that overlap with stores that have not yet written the cache 180/280. These double-words from the store data queue should be used as the load data instead of double-words of data from the cache 120/220 (normally implemented using a 2 to 1 multiplexer (mux) 190/290).

Given the even versus odd double-word structure of both the cache and the store data queue, one easy method of implementing the load versus store compares is to have separate even double-word address compares and odd double-word address compares. This provides for determining which store queue entries could be used for store forwarding purposes on a per even/odd double-word basis. Then, the potentially multiple store queue entries that compare with the load can be filtered down to a single entry by determining which entry contains the most recent value for the double-word, The most recent double-word from stores (if any) can then be determined and used to replace cache data on a per even/odd double-word basis.

One method that may be used by the enhanced microarchitecture 100 for determining the most recent double-word of data is to also use double-word address compares 170/370 for store requests. The results of these address compares are used to determine which store queue entries should have their "I am the most recent double-word" state bits reset 372 at the same time that a current store request sets the "I am most recent double-word" state bit for its store queue entry (or entries) 373 if they are all for the same double-word. In this way, there should always only be at most one store queue entry with its "I am most recent double-word" state bit on for any given memory aligned double-word at block 375. These state bits can then be ANDed individually with their corresponding store address queue entry compares to determine which of the compares corresponds to the entry that is the most recent for that double-word. In addition, the store forwarding valid bits can be ANDed individually with their corresponding compares and most recent double-word state bits to determine whether the most recent store data queue entry can be used for store forwarding and replace the cache data 170/274.

As the background data for stores may not always be able to access the most recent data value from the cache, a further technique is used by the enhanced microarchitecture 100. Note that in this context, the background data access is like a load in that the most recent data may not yet be available because a store ahead of it in the pipeline has not yet written its store data into the cache. In particular, this becomes a problem when the stores that are ahead in the pipeline need to write to the double-word that the current store needs as background data, but the bytes of the stores that are ahead are not pure subsets of the bytes of the current store (for that double-word) such that they truly modify bytes that are background data that will not be overwritten by the current store.

Using the same terminology as load-hit-store, this situation can be termed a "store-hit-store" or background data-hit-store. In this embodiment, the solution to this store-hit-store problem is to simply treat each store request with address like a fetch request with address and solve the store-hit-store problem for stores in the same way that the load-hit-store problem is solved for loads. The results of address comparisons with the store address queue 170/370 that were used for loads as part of the load-hit-store solution are now used as part of the store-hit-store solution. Like loads, store background data can only be forwarded from store queue entries that have the "I am most recent double-word" state and that already have their store data 374. There may be situations where the store-hit-store problem cannot be resolved using store forwarding from the store queue (one example would be the store data is not yet available for forwarding) 371, but this same problem would exist for regular load-hit-store situations that cannot be resolved with store forwarding 271. This problem can be solved by taking the same action as a load-hit-store situation where a delay of the load (or store) is necessary, or some other special solutions must be used. If the store-hit-store problem can be resolved using store forwarding, then for the appropriate double-words, the data from the most recent store data queue entry 180/380 is used to write background data into the store data queue entry 100/300 for the current store instead of data from the cache 130/330. As mentioned above, additionally this situation would result in the store queue entry that was considered most recent for this double-word (and that was the source for the current store request background data) to result in getting its "I am most recent" state bit reset (due to the address compare) 372 and for the current store request to get its "I am most recent" bit set 373, thus correctly updating which store queue entry is most recent and avoiding having multiple entries to the same double-word tagged as most recent.

Accessing and generating the most recent background data for each store has other potential benefits. One example is the ability to easily add functionality to the design to accurately detect stores that do not change any data in memory. These stores that write or "update" memory with the same value that already exists in memory is commonly known as "silent stores". Because these silent stores cause no change to the values of memory, there is no need to process these stores once they are detected and valuable resources may be conserved by not writing these stores to memory.

Before describing the next additional functionality to this embodiment, some background must be provided on typical cache structure and design. A typical cache can be broken into two conceptual parts: one part holds the data and is typically called "the cache" or "the cache array" and the other part holds the address corresponding to the data and is typically called the "directory". The correct data is determined to be in the cache if the address of the requested data is found in a valid entry within the directory. This is also known as a "cache hit". One popular form of cache and directory structure is known as "set associativity". A cache with set associativity has a number of "rows" and a number of "sets". Each row of the cache array and directory contains a number of entries with each of these entries denoted by a unique set identifier (abbreviated as "set id"). A row of the data is accessed from the cache array and a row of addresses is accessed from the directory using a subset of the overall address. This subset of the address used to access a row in the cache and directory is referred to as the index address. Then the rest of the address for the access is compared to the addresses of the row of entries accessed by the directory. If there is an address match, a "hit" is indicated and the set id of the entry hit in that row in the directory is sent to the cache array. This set id is then used to select the correct entry of data from the row in the cache array. If there is no address match, then a "miss" is indicated and there is no valid set id corresponding to this access and there is no valid data from the cache array. After a processor encounters a cache miss, it must retrieve the requested data from another cache or from memory into its cache and then update its directory with the request address for this data in order to get a hit and return the requested data from its cache in the future.

The address compares used to select the correct store data queue entry for store forwarding (if any) do not have to be implemented as full double-word address compares (in this embodiment comparing address bits 0 to 60). Due to timing and physical design constraints, it may not be possible or desirable to implement such wide compares. This is especially true if the microprocessor pipeline requires data from the cache to be accessed immediately after the address is generated, the cache has a very fast access time, and implementing a full compare would result in store forwarding data arriving later than cache data. One solution to this is to use a mechanism to predict which store queue entry will likely need to be used for store forwarding and to take corrective actions if this prediction is wrong. One example of a prediction mechanism involves using only a part of the address range for comparing when selecting a store data queue entry for store forwarding. If the cache uses set associativity, one implementation calls for comparing of the address bits used to index the cache (down to the double-word). Typically, the address bits used to index a set associative cache are known early, but the set identifiers used to select the data in the cache from the correct set are known much later since they are typically generated after accessing a row in the directory and performing a large address compare, and also the set id information is needed much later by the cache (after the correct row has been accessed from the cache). Using a subset of address bits for compares does allow for multiple store queue entries to compare to the load, but this can be handled by filtering the compares by only allowing entries with the "I am most recent double-word" state bit (described above) to be forwarded.

In order to avoid multiple entries being selected for store forwarding after this filtering, all stores using the same cache index (down to the double-word) can be treated as being to the same double-word for the purposes of setting or resetting the "I am the most recent double-word" (in effect the state then becomes "I am the most recent double-word for all double-words matching this cache index"). Recall that for background data, stores like loads must hit in the directory and cache and retrieve the correct set id information for accessing the cache. For this reason (and often others), the store must hit in the directory with a valid set id before the operation can complete, and this set id information can be recorded in the store queue. The assumption is that any load that uses the same cache index as an outstanding store will likely also be accessing the same set id as the store. Later, after the set id of the load is known, the load set id must be compared to the set id associated with the store data that was forwarded to determine if the prediction based only on cache index was correct (some cache designs already save off the set id for all stores anyway for writing the cache for stores). If the prediction is correct, no special action is needed. If the prediction is incorrect, then the data for the load request must be thrown away, and the load request must be redone. To avoid repeating this mis-prediction, one could reset the state that allows forwarding from the store that was incorrectly forwarded. Note that this general prediction mechanism of using a subset of the address bits for the initial compare used to select the correct store data queue entry can also be applied to caches that do not employ set associativity. If the cache is a direct mapped design, an arbitrary subset of address bits can be used for prediction and a simple cache hit indication can be used in place of set id compares to determine if the store forwarding action was correct.

The enhanced microarchitecture 100 can be modified to handle additional functions. One example of an additional function is fulfilling an architectural requirement to process store instructions that store more data than can be delivered on a single store pipe or on a single cycle (known as "long storing instructions"). The general solution would be to break up the long storing instruction into many smaller stores that each store on the maximum data size that can be delivered on a pipe within a single cycle. One implementation would be to treat each of these smaller stores just like any other "short" storing instruction.

Another example of an additional function is addressing a physical design area, wiring, or cycle time requirement that precludes the ability of comparing and selecting every block of store data that has been delivered and buffered but has not yet written the cache. In this case, one solution is to pre-select a subset of all the store data that has been delivered and needs to be buffered (before writing the cache) for store forwarding and to put only the selected store data and store addresses in the structures used for store forwarding. There are various methods or algorithms that can be applied to predict which blocks of store data are most likely to be referenced by future fetches or stores to optimize performance. One example of an algorithm for selecting a subset of data for forwarding is selecting only the first memory aligned block (double-word if using the above embodiment) and last memory aligned block of store data for store forwarding. This algorithm is useful for situations where there are long storing instructions. In this case, all of the "middle" memory aligned blocks would be buffered for writing the cache, but would not be available for store forwarding 151. Though this solution would technically introduce a type of memory area overlap restriction, in reality this is just a simple way of restricting the implementation cost of supporting store forwarding for long stores by only making a subset of the total store data available for forwarding. Thus, supporting various kinds of memory area overlap between loads and stores is not an inherent problem for the enhanced microarchitecture 100.

The technical effects and benefits include, among other things, solutions that are provided to overcome situations where the most recently updated value for an address location from a respective store is not available for a load to use including cases where store data only partially overlaps with load data and cases where multiple stores may partially overlap with the load data and partially overlap with each other.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for loading data in a pipelined microprocessor, the method comprising:
    issuing a load request that comprises a load address requiring at least one block of data, the at least one block of data the same size as a largest contiguous granularity of data returned from a cache;
    determining that the load address matches at least one block address in a store address queue, wherein determining that there is a match comprises using a cache index address for a comparison between the load address and an address in the store address queue;
    based on determining that there is an address match, performing a) through c):
        a) reading a data block from a buffer register designated by the matching address in the store address queue and sending the data block along with data from the cache to satisfy the load request for a most recent entry in the store address queue that matches the load address;
        b) comparing a unique set id of the data block to the set id of the matching address in the store address queue after sending the data block;
        c) based on determining that there is a set id match, continuing the load request, or, based on determining that there is not a set id match, setting a store-forwarding state of the matching address in the store address queue to no store-forwarding and rejecting the load request; and reading a data block from a cache based on the load address and sending the data block to satisfy the load request, based on determining that there is no address match.

2. The method as in claim 1, further comprising, determining that the store-forwarding state of a matching address in the store address queue is set for no store-forwarding based on determining that there is a match, and performing no store-forwarding based on determining that the store-forwarding state of the matching address in the store address queue is set to no store-forwarding.

3. The method as in claim 1, where, for a match, a most recent entry in the store address queue is determined using a most recent data state.

4. The method as in claim 1, wherein a size of a block of data is based on the largest granularity of data supported by the microprocessor.

5. The method as in claim 1, wherein the store address queue comprises a starting address register, an ending address register, a starting data register, an ending data register and at least one state bit.

6. A pipelined microprocessor comprising circuitry configured to perform store-forwarding, the microprocessor comprising circuits for performing:

issuing a load request that comprises a load address requiring at least one block of data, the at least one block of data the same size as a largest contiguous granularity of data returned from a cache;

determining that the load address matches at least one block address in a store address queue, wherein determining that there is a match comprises using a cache index address for a comparison between the load address and an address in the store address queue;

based on determining that there is an address match, performing a) through c):

a) reading a data block from a buffer register designated by the matching address in the store address queue and sending the data block along with data from the cache to satisfy the load request for a most recent entry in the store address queue that matches the load address b) comparing a unique set id of the data block to the set id of the matching address in the store address queue after sending the data block;

c) based on determining that there is a set id match, continuing the load request, or, based on determining that there is not a set id match, setting a store-forwarding state of the matching address in the store address queue to no store-forwarding and rejecting the load request; and reading a data block from a cache based on the load address and sending the data block to satisfy the load request, based on determining that there is no address match.

7. The microprocessor as in claim 6, wherein a size of a block of data is based on the largest granularity of data supported by the microprocessor.

8. The microprocessor as in claim 6, wherein the store address queue comprises a starting address register, an ending address register, a starting data register, an ending data register and at least one state bit.

9. The microprocessor as in claim 6, further comprising, determining that the store-forwarding state of a matching address in the store address queue is set for no store-forwarding based on determining that there is a match, and performing no store-forwarding based on determining that the store-forwarding state of the matching address in the store address queue is set to no store-forwarding.

10. The microprocessor as in claim 6, where, for a match, a most recent entry in the store address queue is determined using most recent data state.

* * * * *